United States Patent [19]

Ichihara et al.

[11] Patent Number: 5,809,019
[45] Date of Patent: Sep. 15, 1998

[54] TRANSMISSON DIVERSITY SYSTEM

[75] Inventors: Masaki Ichihara; Yukitsuna Furuya, both of Tokyo, Japan

[73] Assignee: NEC Corporation, Tokyo, Japan

[21] Appl. No.: 637,499

[22] Filed: Apr. 25, 1996

[30] Foreign Application Priority Data

Apr. 28, 1995 [JP] Japan .................................. 7-128891

[51] Int. Cl.⁶ .................................................. H04B 7/02
[52] U.S. Cl. ........................ 370/334; 370/491; 375/267; 375/347
[58] Field of Search .................................. 370/252, 334, 370/491; 375/267, 347; 455/101

[56] References Cited

U.S. PATENT DOCUMENTS 5,097,484  3/1992  Akaiwa .................................. 375/267
5,598,404  1/1997  Hayashi et al. ........................ 375/267

FOREIGN PATENT DOCUMENTS

2-200018  8/1990  Japan .
5-29992   2/1993  Japan .

Primary Examiner—Melvin Marcelo
Attorney, Agent, or Firm—Ostrolenk, Faber, Gerb & Soffen, LLP

[57] ABSTRACT

In a transmission diversity system for selecting one of a plurality of radio transmission systems in a base station to perform diversity transmission of data to a mobile station, the base station adds transmission data and identification signals different in the plurality of radio transmission systems to transmit resultant radio signals from the plurality of radio transmission systems, and transmits transmission data from one radio transmission system based on optimal radio transmission system information transmitted as a radio wave from the mobile station. The mobile station determines an identification signal representing an optimal reception state from the plurality of identification signals detected from the data received from the plurality of radio transmission systems of the base station and transmits the determined optimal radio transmission system information to the base station.

12 Claims, 7 Drawing Sheets

TRANSMISSON DIVERSITY SYSTEM

BACKGROUND OF THE INVENTION

The present invention relates to a transmission diversity system used in a mobile radio communication system for communication between a base station and a mobile station to perform diversity transmission from the base station to the mobile station.

In a conventional mobile radio communication system, the reception state (reception sensible state) of a transmission radio wave from a base station changes in a vehicle mobile station upon fading during the travel of the vehicle mobile station.

The reception field strength at the mobile station changes due to interference caused by a difference between radio wave propagation paths upon reflection or diffraction of the radio wave at a mountain or the like. That is, fading occurs. Multiple radio wave propagation (multi-path) occurs due to irregular reflection at a building in a city. In this case, the period is short and deep fading tends to occur. As a countermeasure for this, an antenna diversity reception system is used.

In this antenna diversity reception system, a signal having the highest field strength is selected from all the reception signals from a plurality of antennas having less correlation. In this case, the plurality of antennas are spaced apart from each other to obtain a low correlation level, and cables are connected to these antennas. That is, the apparatus becomes bulky at high cost. In particular, it is difficult to employ this system to a compact portable telephone carried by a user.

A technique as an improved technique of the above antenna diversity reception system is described in Japanese Patent Laid-Open No. 5-29992 in which transmission is performed from a base station in a transmission diversity so as to obtain the same effect as that of a reception diversity.

Figure 4:
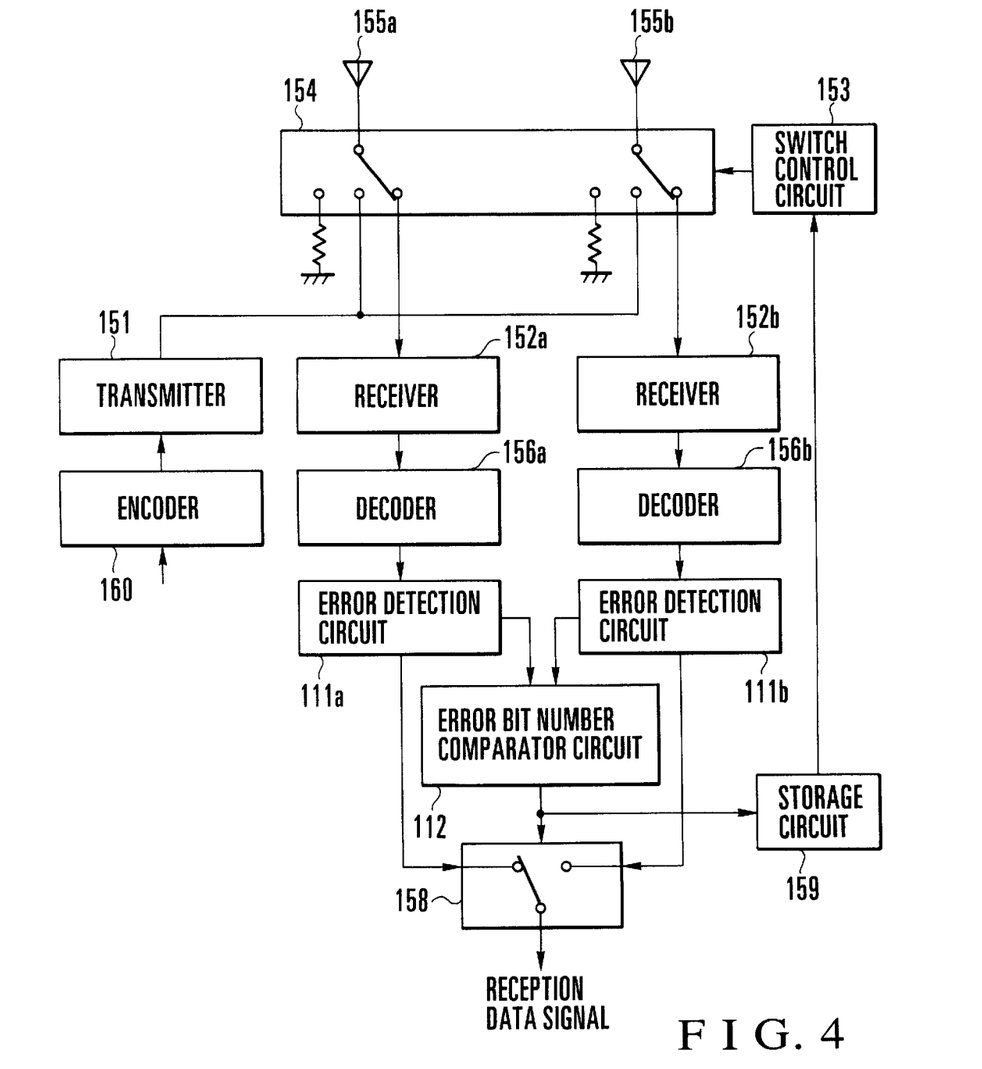
FIG. 4 is a block diagram showing the arrangement of a conventional transmission diversity system.

FIG. 4 shows the arrangement of this transmission diversity system.

Referring to FIG. 4, the transmission frequency is equal to the reception frequency in this example, and TDD (Time Division Duplex) can be applied as a transmission scheme between a base station and a mobile station. In a reception time slot, an antenna 155a is connected to a receiver 152a, and an antenna 155b is connected to a receiver 152b under the control of a switch control circuit 153. A signal transmitted from a mobile station and received by the receiver 152a is decoded by a decoder 156a, and its error is detected by an error detection circuit 111a.

Similarly, a signal transmitted from the mobile station and received by the receiver 152b is decoded by a decoder 156b, and its error is detected by an error detection circuit 111b. An error bit number comparator circuit 112 identifies one of reception paths (i.e., one of signals from the antennas 155a and 155b) which has a smaller number of errors in accordance with the number of bits output from the error detection circuits 111a and 111b for the respective reception paths, and this identification result is stored in a storage circuit 159.

At the same time, a baseband switch 158 selects a reception data signal from the reception path having a smaller number of errors on the basis of this identification result and outputs the reception data signal to the next stage. In this manner, diversity reception is performed in the base station.

In a transmission time slot, a high frequency switch 154 is controlled by the switch control circuit 153 on the basis of the reception path information stored in the storage circuit 159. One of the signals (reception paths) from the antennas 155a and 155b which has a smaller number of errors in reception is connected to a transmitter 151 under the control of the switch control circuit 153, and the other one of the signals from the antennas 155a and 155b is grounded. Therefore, diversity transmission can be performed.

In this case, an antenna selected at the time of reception obtains optimal pattern characteristics also in transmission. In addition, this reception/transmission time slot has a short period of time, so that a multipath (fading) during this period of time can be neglected. Although the above scheme can be applied to a PHP (Personal Handy-Phone system), it cannot be applied when the transmission frequency is different from the reception frequency. In addition, no effect can be expected for fading having a period shorter than that of the transmission/reception interval (time slot).

Another technique of this type described in Japanese Patent Laid-Open No. 2-200018 is known.

Figure 5A:
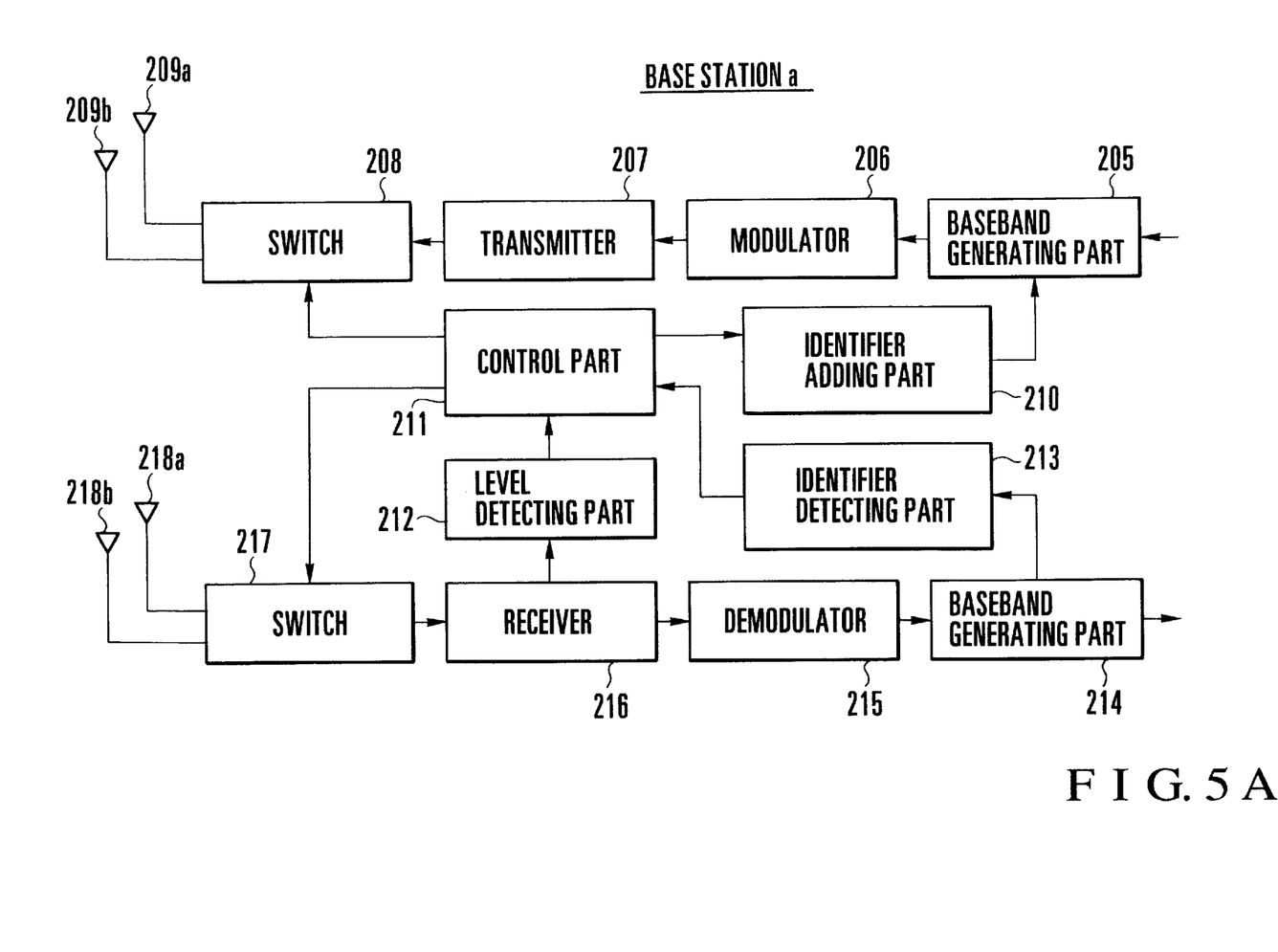
FIGS. 5A and 5B are block diagrams showing the arrangements of a base station and a mobile station of another conventional transmission diversity system.
Figure 5B:
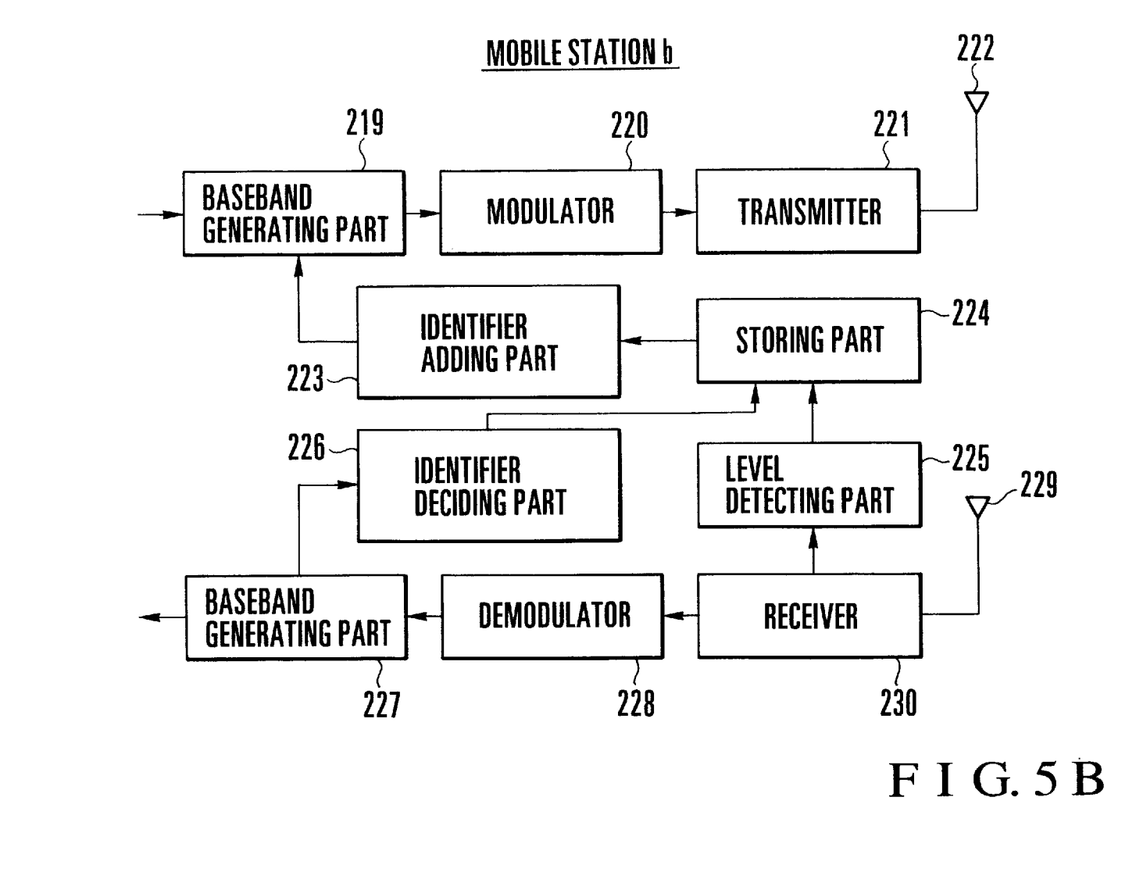

FIGS. 5A and 5B show the arrangements of a base station and a mobile station, respectively.

FIG. 5A shows a base station a for transmitting data and FIG. 5B shows a mobile station b for receiving the data. Through a control part 211, an identifier adding part 210, and a baseband generating part 205, the base station a adds, to the first packet, a branch identifier representing a radio transmission system (radio transmission line: branch) for transmitting the first packet. The base station a transmits data through a modulator 206, a transmitter 207, a switch 208, and one branch of antennas 209a and 209b. Another branch is selected for the second packet, and its branch identifier is added to the second packet. The resultant packet data is transmitted.

On the other hand, in the mobile station b, a packet transmitted from another branch is received through an antenna 229 and a receiver 230. The reception level is detected by a level detecting part 225. If a reception level is high, the corresponding branch is stored in a storing part 224. A branch identifier discriminated through a demodulator 228, a baseband generating part 227, and an identifier detecting part 226 is stored in the storing part 224. Transmission is performed from an identifier adding part 223 through a baseband generating part 219, a modulator 220, a transmitter 221, and an antenna 222.

A signal transmitted from the mobile station b is received through one of antennas 218a and 218b, a switch 217, and a receiver 216. This transmission level (field strength) is detected by a level detecting part 212. At the same time, a branch identifier is discriminated through a demodulator 215, a baseband generating part 214, and an identifier deciding part 213. The discriminated branch identifier 211 is supplied, and one of the antennas 209a and 209b is selected on the basis of the branch identifier.

As described above, the mobile station decides the optimal branch. The decision result is notified to the base station a, and the base station a selects an optimal antenna, thereby performing diversity transmission.

Figure 6A:
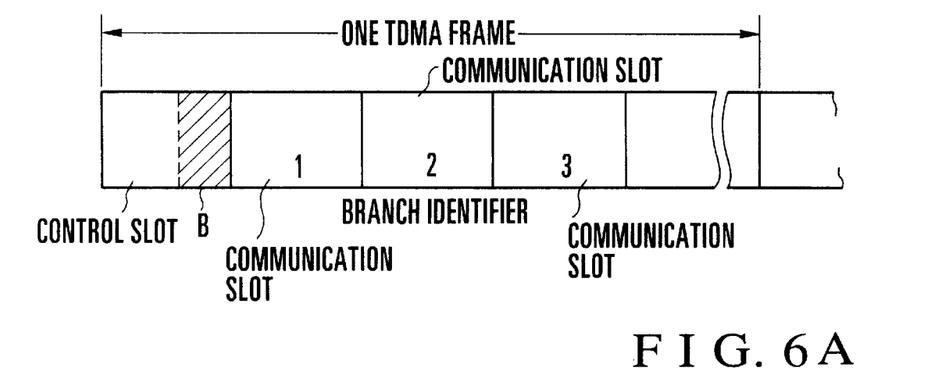
FIGS. 6A to 6C are views showing the radio channel arrangement to which the TDMA/FDD scheme is applied to the prior art.
Figure 6B:
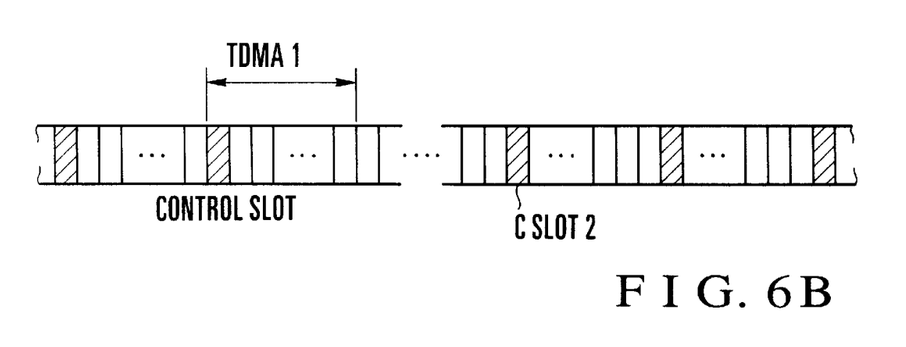
Figure 6C:
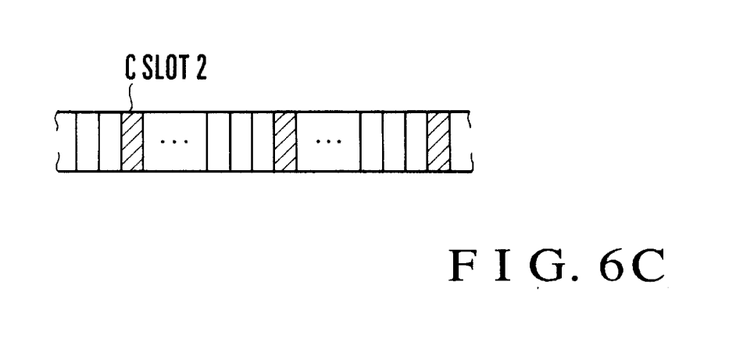

FIGS. 6A to 6C show the format of a radio channel to which the TDMA (Time Division Multiple Access) or FDD scheme is applied.

FIG. 6A shows a frame structure, FIG. 6B shows a download link, and FIG. 6C shows an upload link. The frame structure has one TDMA frame, a control slot, communication slots, and a branch identifier B in the control slot.

The download link in one frame is constituted by a control slot and a communication slot. The upload link has a communication slot. A notification signal including the branch identifier is transmitted in the download link control slot every predetermined time interval to notify the mobile station of the base station information and the like. Every time this notification signal is transmitted, the transmission antenna is switched to the other. Every time the mobile station receives the notification signal, the mobile station detects the level of the reception field strength, and stores the detection result. This processing is repeated to determine the branch having a maximum field strength level.

The branch identifier selected in this determination is inserted in data, and the resultant data is transmitted. For example, in a communication slot C assigned to the mobile station, the mobile station transmits the selected identifier to the base station through the slot in the upload link. Upon reception of the selected branch identifier, the base station transmits the time slot assigned to the mobile station from the antenna based on the branch identifier. In this manner, the transmission antennas are switched every third frame, which frame interval is minimum.

In the prior arts described above, the former example cannot be applied when the transmission frequency is different from the reception frequency, and no effect is obtained in fading whose interval is shorter than the transmission/reception interval. The latter example can be applied even if the transmission frequency is different from the reception frequency. Since the latter method is based on packet transmission, the field strength in the branch must be time-divisionally measured. For example, when the length of one TDMA frame is 8 ms, the shortest period capable of allowing field strength measurement is 16 ms which corresponds to a two-frame period, i.e., a frequency of about 60 Hz. This is not suitable for cellular diversity in which fading of 100 Hz tends to occur. In addition, since a mobile radio system for continuously transmitting data is also available, continuous, high-speed diversity transmission is desired.

SUMMARY OF THE INVENTION

The present invention has been made to solve the conventional drawbacks described above, and has as its object to provide a transmission diversity system capable of notifying a base station of optimal radio transmission system information obtained by causing a mobile station to measure an identification signal always transmitted from the base station, and of performing continuous, high-speed diversity transmission and stable reception at the mobile station in a CDMA (Code Division Multiple Access) scheme employing a spread spectrum modulation scheme.

In order to achieve the above object of the present invention, there is provided a transmission diversity system for selecting one of a plurality of radio transmission systems in a base station to perform diversity transmission of data to a mobile station, wherein the base station adds transmission data and identification signals different in the plurality of radio transmission systems to transmit resultant radio signals from the plurality of radio transmission systems, and transmits transmission data from one radio transmission system based on optimal radio transmission system information transmitted as a radio wave from the mobile station, and the mobile station determines an identification signal representing an optimal reception state from the plurality of identification signals detected from the data received from the plurality of radio transmission systems of the base station and transmits the determined optimal radio transmission system information to the base station.

In the transmission diversity system having above arrangement, the base station transmits radio adds identification signals different in a plurality of radio transmission systems and transmission data multiplexed by the CDMA scheme and transmits radio signals respectively from the plurality of radio transmission systems. The mobile station detects a plurality of identification signals for the plurality of radio transmission systems from the data received from the base station and determines an identification signals representing an optimal reception state. The determined optimal radio transmission system information is transmitted to the base station. The base station transmits data from one radio transmission system based on the optimal radio transmission system information transmitted from the mobile station.

In this case, the base station transmits a plurality of types of identification signals different in the plurality of radio transmission systems, and the mobile station transmits optimal radio transmission system information of one identification signal representing the optimal reception state.

The base station transmits a plurality of types of identification signals which are different in the plurality of radio transmission systems and are delayed from a reference identification signal, and the mobile station transmits optimal radio transmission system information on the basis of a delay profile representing the intensity distribution of identification signals with respect to the delay time upon calculation of a sliding function.

In this manner, the field strength of the identification signal always transmitted from the base station is measured by the mobile station, and the optimal radio transmission system information is notified to the base station on the basis of this measurement. As a result, continuous, high-speed diversity transmission can be performed in the CDMA employing the spread frequency modulation scheme.

DESCRIPTION OF THE PREFERRED EMBODIMENT

Embodiments of transmission diversity systems according to the present invention will be described with reference to the accompanying drawings.

Figure 1:
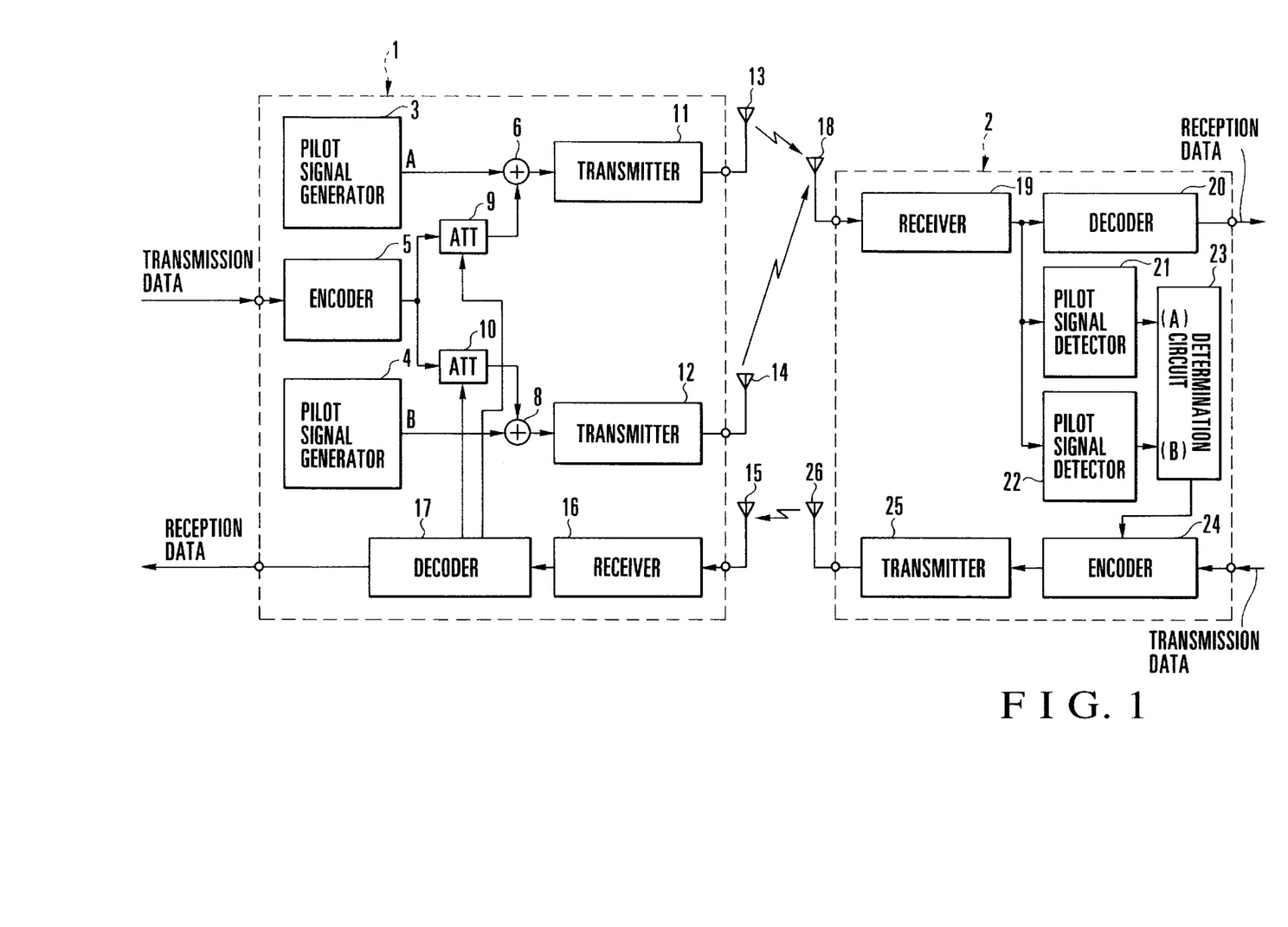
FIG. 1 is a block diagram showing the arrangement of a transmission diversity system according to the first embodiment of the present invention.

FIG. 1 shows the arrangement of a transmission diversity system according to the first embodiment.

The first embodiment shown in FIG. 1 mainly comprises a base station 1 having two branches (radio transmission systems) and a mobile station 2.

The base station 1 comprises a pilot signal generator 3 for generating a pilot signal A for identifying one of the two branches, and a pilot signal generator 4 for generating a pilot signal B for identifying the other of the two branches. In addition, the base station 1 comprises an encoder 5 for encoding and outputting transmission data, an adder 6 for adding the pilot signal A and the encoded data, and an adder 8 for adding the pilot signal B and the encoded data.

The base station 1 also comprises attenuators (ATTS) 9 and 10 for attenuating the level of the encoded data from the encoder 5, a transmitter 11 and an antenna 13, both of which modulate the pilot signal A and the encoded data from the ATT 9, set a transmission frequency, and transmit the resultant data, and a transmitter 12 and an antenna 14, both of which modulate the pilot signal B and the encoded data from the ATT 10, set a transmission frequency, and output resultant data.

The base station 1 further comprises an antenna 15 for receiving a radio wave transmitted from the mobile station 2, a receiver 16 for receiving a signal from the antenna 15, performing high-frequency amplification, frequency conversion, and demodulation, and outputting a demodulated signal, and a decoder 17 for decoding the demodulated signal from the receiver 16 and outputting the reception data.

The mobile station 2 comprises an antenna 18 for receiving a radio wave from the base station 1, a receiver 19 for performing high-frequency amplification, frequency conversion, and demodulation of the signal received from the antenna 18, and a decoder 20 for decoding the demodulated signal from the receiver 19 and outputting the decoded data. The mobile station 2 also comprises a pilot signal level detector 21 for detecting the pilot signal A from the demodulated signal from the receiver 19 and the level (reception field strength) of this signal, and a pilot signal level detector 22 for detecting the pilot signal B from the demodulated signal from the receiver 19 and the level (reception field strength) of this signal.

The mobile station 2 further comprises a determination circuit 23 for comparing the pieces of level information of the pilot signals A and B from the pilot signal level detectors 21 and 22 and determining one of the pilot signals A and B which has a higher level, an encoder 24 for encoding transmission data, inserting branch information of the determination result into this encoded data, and outputting the resultant data, and a transmitter 25 and an antenna 26, both of which transmit the encoded data from the encoder 24 and the determination result to the base station 1.

The operation of the first embodiment will be described below.

The pilot signal A output from the pilot signal generator 3 is always transmitted through the adder 6, the transmitter 11, and the antenna 13. The pilot signal B output from the pilot signal generator 4 is always transmitted through the adder 8, the transmitter 12, and the antenna 14. Data to be transmitted to the mobile station 2 is input to the encoder 5, and the encoded data is output to the ATTs 9 and 10.

The encoded data from the ATT 9 is added (superposed) by the adder 6, and the resultant data is transmitted from the transmitter 11 to the mobile station 2 through the antenna 13. The encoded data from the ATT 10 is added (superposed) by the adder 8, and the resultant data is transmitted from the transmitter 8 to the mobile station 2 through the antenna 14. The radio wave from the base station 1 is received by the antenna 18 of the mobile station 2 and is input to the receiver 19. The receiver 19 performs high-frequency amplification, frequency conversion, and demodulation. Data received from the base station 1 and decoded from the demodulated signal by the decoder 20 is output.

The demodulated signal output from the receiver 19 is input to the pilot signal level detector 21 to detect the pilot signal A, and its level (reception field strength) is detected. At the same time, the demodulated signal output from the receiver 19 is input to the pilot signal level detector 22 to detect the pilot signal B, and its level (reception field strength) is detected.

The pieces of level information of the pilot signals A and B which are detected by the pilot signal level detectors 21 and 22 are input to the determination circuit 23. The determination circuit 23 compares the pieces of input level information to determine that the pilot signal A or B has a higher level. In other words, transmission of one of the branches which has a higher field strength is determined. The optimal branch information of the determination result is output to the encoding circuit 24. The encoding circuit 24 encodes the transmission data, inserts the optimal branch information in the encoded data, and transmits the resultant data from the transmitter 25 to the base station 1 through the antenna 26.

The radio wave from the mobile station 2 is received by the receiver 16 through the antenna 15 of the base station 1, and the demodulated signal from the receiver 16 is input to the decoder 17. The data transmitted from the base station 1 is decoded by the decoder 17, and at the same time the optimal branch information is extracted. This optimal branch information changes the gains of the ATTs 9 and 10.

When the branch of the pilot signal A represents the optimal branch information, the gain of the ATT 10 is set to, e.g., −30 dB, and no attenuation is performed in the ATT 9. Transmission of the encoded data from the branch (the transmitter 12 and the antenna 14) of the pilot signal B is stopped, and the encoded data from the branch (the transmitter 11 and the antenna 13) of the pilot signal A is transmitted.

When the branch of the pilot signal Ba represents optimal branch information, an operation reverse to the above operation is performed. That is, the gain of the ATT 9 is set to, e.g., −30 dB, and transmission of the encoded data from the branch of the pilot signal A is stopped.

As described above, the optimal branch information having a good reception state is identified in the mobile station 2, and this optimal branch information is transmitted to the base station 1. The data is transmitted from the branch selected by the base station 1 on the basis of the optimal branch information. For this reason, continuous, high-speed diversity transmission is performed, and stable reception is allowed in the mobile station 2.

Figure 2:
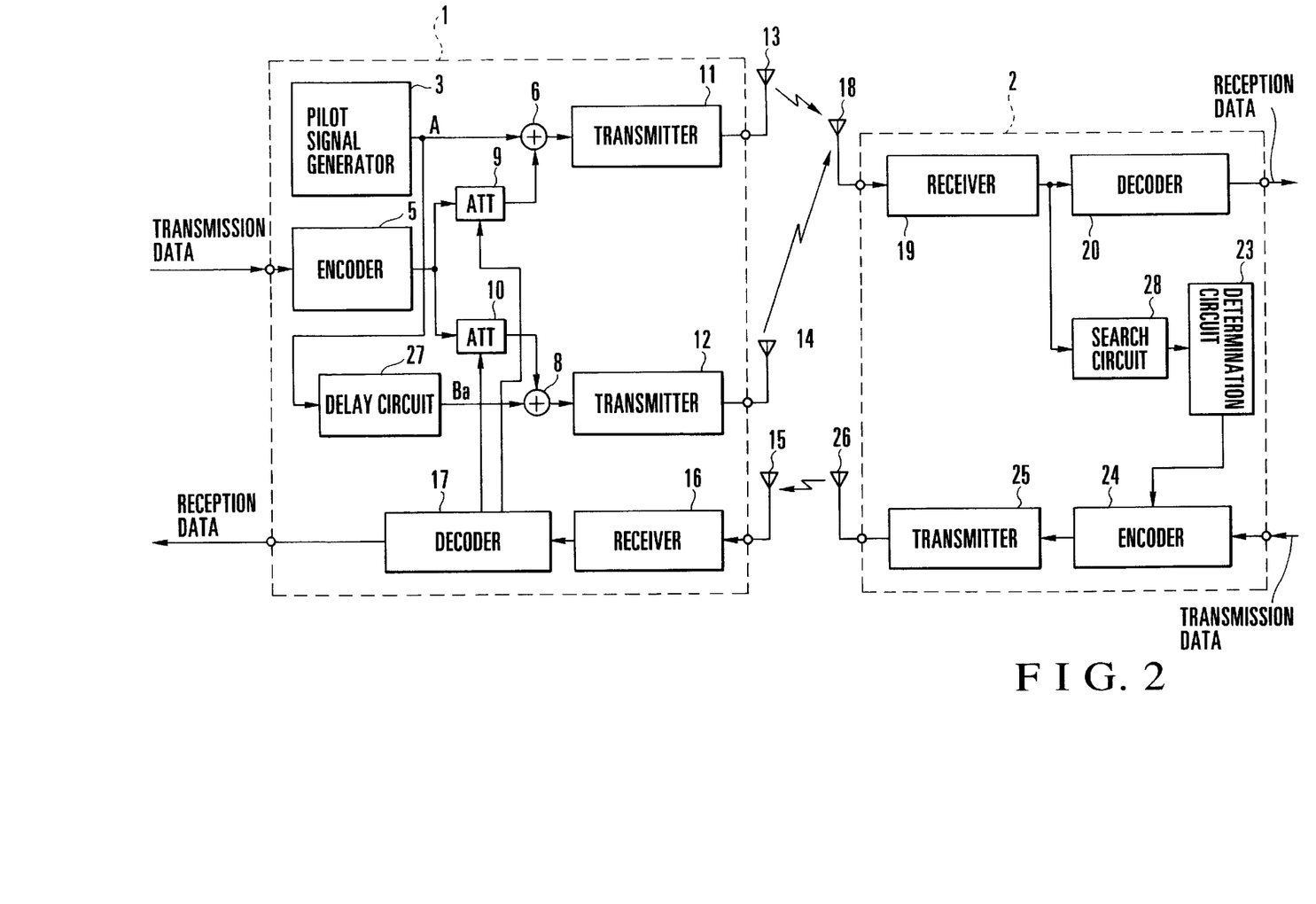
FIG. 2 is a block diagram showing the arrangement of a transmission diversity system according to the second embodiment of the present invention.

FIG. 2 shows the arrangement of the second embodiment.

The second embodiment shown in FIG. 2 has a base station 1 having two branches and a mobile station 2, as in the first embodiment. The base station 1 comprises a pilot signal generator 3 for generating a pilot signal A, an encoder 5, adders 6 and 8, ATTs 9 and 10, transmitters 11 and 12, antennas 13, 14, and 15, a receiver 16, and a decoder 17.

A delay circuit 27 for delaying the pilot signal A output from the pilot signal generator 3 as the second embodiment to output a pilot signal Ba to the adder 8 is arranged.

The mobile station 2 comprises an antenna 18, a receiver 19, a decoder 20, a determination circuit 23, an encoder 24, a transmitter 25, and an antenna 26. The mobile station 2 also comprises a search circuit 28 for searching and identifying the pilot signals A and Ba as the second embodiment, and detecting the levels of the pilot signals A and Ba.

The operation of the second embodiment will be described below.

The pilot signal A output from the pilot signal generator 3 is input to the adder 6 and the delay circuit 27. The delay circuit 27 delays the pilot signal A by a time T to output the pilot signal Ba to the adder 8. As in the first embodiment, the encoded data output from the encoder 5 is input to the adders 6 and 8 through the ATTs 9 and 10 and added to the pilot signals A and Ba. The resultant signals are transmitted from the transmitters 11 and 12 and the antennas 13 and 14.

As in the first embodiment, the mobile station 2 performs processing in the antenna 18, the receiver 19, and the decoder 20. The demodulated signal from the receiver 19 is input to the search circuit 28. The search circuit 28 searches and identifies the pilot signals A and Ba and detects the levels of the pilot signals A and Ba.

Figure 3:
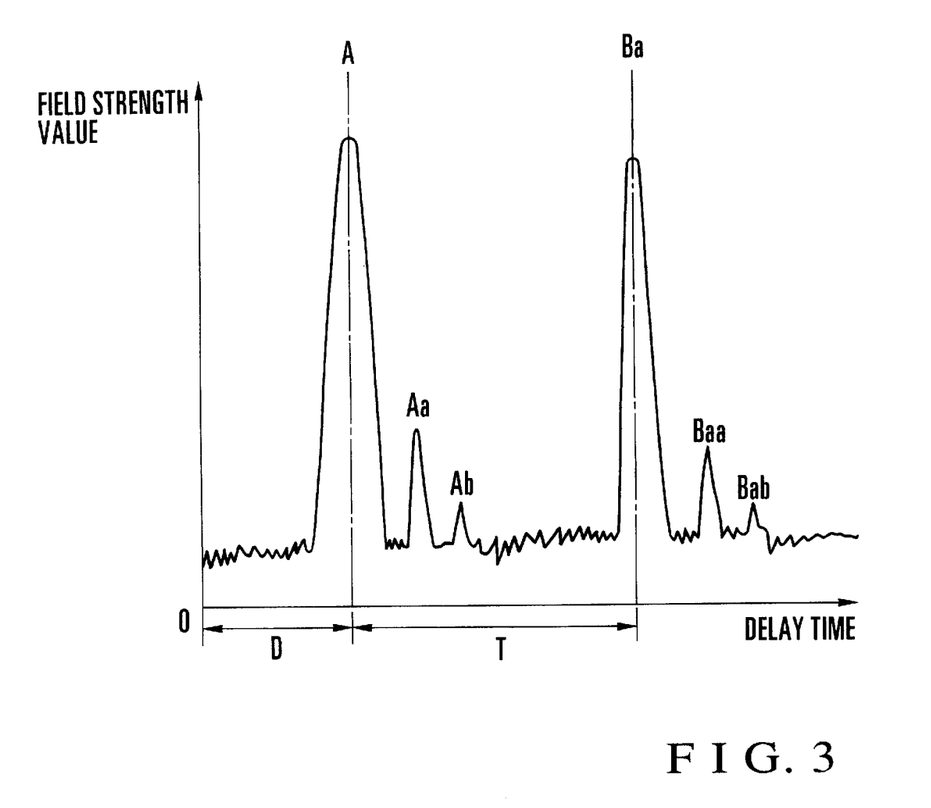
FIG. 3 is a graph for explaining the identification of pilot signals in a search circuit and the states of levels in FIG. 2.

FIG. 3 explains the identification and level states of the pilot signals A and Ba in the search circuit 28.

Referring to FIGS. 2 and 3, the search circuit 28 uses a correlator for calculating a sliding function between the pilot signal A and a reception signal. The delay profile representing the levels (field strength values) of the pilot signals A and Ba with respect to the delay time is obtained from the correlation calculation result, as shown in FIG. 3.

Referring to FIG. 3, a time D is a delay time for radio wave propagation between the base station 1 and the mobile station 2, and a time T is a time between the pilot signal A and the pilot signal Ba obtained by delaying the pilot signal A by the delay circuit 27. Since the time T is known in advance, the capture of the pilot signal A allows identification of the pilot signal Ba present during the time T. In this case, when the pilot signals A and Ba of maximum levels are detected, and other pilot signals Aa, Ab, Baa, and Bab are not detected, subsequent determination can be facilitated.

The determination circuit 23 determines one of the pilot signals A and Ba which has a higher level. In other words, transmission from one of the branches which has a higher field strength is determined. The optimal branch information of the determination result is transmitted to the base station 1 through the encoder 24, the transmitter 25, and the antenna 26. Subsequent processing in the base station is identical to that of the first embodiment.

Even in the second embodiment, continuous, high-speed diversity transmission is performed, and stable reception is performed in the mobile station 2 as in the first embodiment.

As can be apparent from the above description, according to a transmission diversity system of the present invention, a base station adds data to be transmitted and a plurality of types of identification signals different in a plurality of radio transmission systems (branches) and transmits the resultant data from the plurality of radio transmission systems. A mobile station determines an identification signal from a radio transmission system representing an optimal reception state from the data received from the base station and transmits the determined optimal radio transmission system information to the base station. Since data is transmitted from one radio transmission system in the base station is transmitted on the basis of this information, continuous, high-speed diversity transmission can be performed, and stable reception can be performed at the mobile station in the CDMA scheme employing the spread spectrum modulation scheme.

What is claimed is:

1. A transmission diversity system for selecting one of a plurality of radio transmission systems in a base station to perform diversity transmission of data to a mobile station,
   wherein said base station adds transmission data and identification signals different in the plurality of radio transmission systems to transmit resultant radio signals from said plurality of radio transmission systems, and transmits transmission data from one radio transmission system based on optimal radio transmission system information transmitted as a radio wave from said mobile station, and
   said mobile station determines an identification signal representing an optimal reception state from the plurality of identification signals detected from the data received from the plurality of radio transmission systems of said base station and transmits the determined optimal radio transmission system information to said base station.

2. A system according to claim 1, wherein
said base station comprises
identification signal generation means for generating the plurality of types of identification signals different in the plurality of radio transmission systems,
setting means for setting transmission or non-transmission of data respectively constituting said plurality of radio transmission systems,
addition means for adding the identification signals from said identification signal generation means and the data output from said setting means and outputting resultant addition data,
base station radio transmitting means for transmitting the radio addition data respectively output from said addition means,
base station radio reception/extraction means for receiving radio transmission from said mobile station and extracting the optimal radio transmission system information representing transmission through an optimal radio transmission system determined by said mobile station, and
selection means for setting non-transmission of data from said setting means except for one radio transmission system based on the optimal radio transmission system information extracted by said base station radio reception/extraction means; and
said mobile station comprises
   mobile station radio reception means for outputting data received from said base station,
   identification signal detection means for detecting the plurality of identification signals different in said plurality of radio transmission systems from data received by said mobile station radio reception means,
   determination means for determining one of the plurality of identification signals detected by said identification signal detection means, and
   mobile station radio transmission means for transmitting the optimal radio transmission system information representing a radio transmission system of said base station which transmits the identification signal determined by said determination means.

3. A system according to claim 1, wherein
said base station comprises
identification signal generation means for generating one identification signal,
delay means for delaying the identification signal from said identification signal generation means;
setting means for setting transmission or non-transmission of data respectively constituting a plurality of radio transmission systems,
addition means for adding data output from said setting means and the identification signal from said identification signal generation means or said delay means and outputting resultant addition data, base station radio transmission means for transmitting the radio addition data respectively output from said addition means;

base station radio reception/extraction means for receiving radio transmission from said mobile station and extracting optimal radio transmission system information representing transmission through an optimal radio transmission system determined by said mobile station, and selection means for setting non-transmission of transmission data from said setting means except for one radio transmission system based on the optimal radio transmission system information extracted by said base station radio reception/extraction means; and said mobile station comprises mobile station radio reception means for outputting data received from said base station, identification signal detection means for detecting the plurality of identification signals of said plurality of radio transmission systems from the data received from said mobile station radio reception means, determination means for determining one of the plurality of identification signals which is detected by said identification signal detection means and represents an optimal reception state, and mobile station radio transmission means for transmitting the optimal radio transmission system information representing a radio transmission system of said base station which transmits the identification signal determined by said determination means.

4. A system according to claim 3, wherein said identification signal detection means comprises:

identification signal search means for calculating a sliding function between a reception signal and the identification signal serving as a reference from said identification signal generation means and obtaining a delay profile representing field strengths of the identification signals with respect to a delay time; and determination means for obtaining the optimal radio transmission system information representing one of the plurality of identification signals which has a highest signal strength from the delay profile obtained by said identification signal search means.

5. A system according to claim 2, wherein said setting means comprises a plurality of variable attenuation means for variably attenuating the transmission data for the respective radio transmission systems and setting the transmission data in an output or non-output mode.

6. A system according to claim 2, wherein said setting means comprises switches for setting transmission or non-transmission of the transmission data for the respective radio transmission systems.

7. A system according to claim 2, further comprising encoding means for encoding a plurality of transmission data for a plurality of mobile stations and outputting encoded data to said setting means.

8. A system according to claim 7, wherein said encoding means employs a CDMA (Code Division Multiple Access) scheme as a multiplexing scheme.

9. A system according to claim 3, wherein said setting means comprises a plurality of variable attenuation means for variably attenuating the transmission data for the respective radio transmission systems and setting the transmission data in an output or non-output mode.

10. A system according to claim 3, wherein said setting means comprises switches for setting transmission or non-transmission of the transmission data for the respective radio transmission systems.

11. A system according to claim 3, further comprising encoding means for encoding a plurality of transmission data for a plurality of mobile stations and outputting encoded data to said setting means.

12. A system according to claim 11, wherein said encoding means employs a CDMA (Code Division Multiple Access) scheme as a multiplexing scheme.

* * * * *